July 14, 1925.

F. KRUSE

SAUSAGE TWISTING MACHINE

Filed March 12, 1924

INVENTOR
Ferdinand Kruse

BY Richards Geier

ATTORNEYS.

July 14, 1925.

F. KRUSE 1,545,586

SAUSAGE TWISTING MACHINE

Filed March 12, 1924 4 Sheets-Sheet 2

INVENTOR
Ferdinand Kruse
BY Richards. Geier
ATTORNEYS

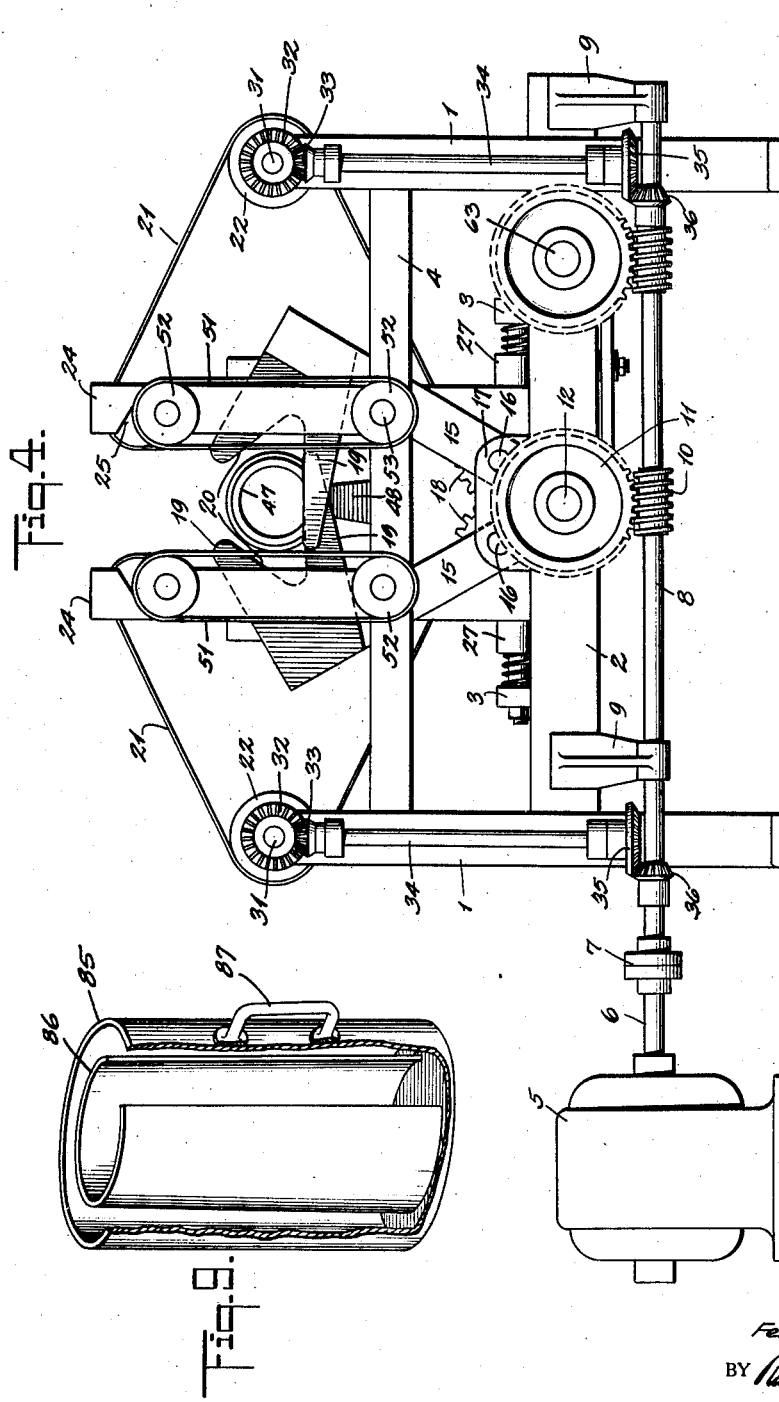

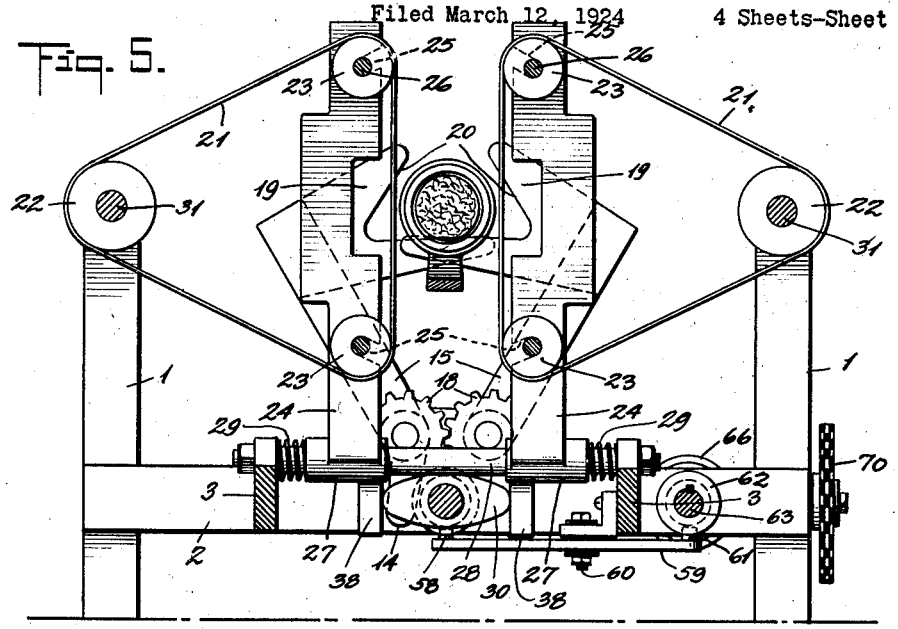

Patented July 14, 1925.

UNITED STATES PATENT OFFICE.

FERDINAND KRUSE, OF NEW YORK, N. Y.

SAUSAGE-TWISTING MACHINE.

Application filed March 12, 1924. Serial No. 698,583.

*To all whom it may concern:*

Be it known that I, FERDINAND KRUSE, a citizen of the United States, residing at New York, county of New York, and State of New York, have invented certain new and useful Improvements in Sausage-Twisting Machines, of which the following is a specification.

This invention relates to means for twisting a sausage casing into links, and has for one of its principal objects to provide a machine of the character described, that is simple in construction, positive and effective in operation, and durable in use.

A further object of the invention is to provide means automatic in operation, adapted to twist a sausage casing into links without subjecting the casing to any strains or stresses that would be liable to injure the casing.

With the foregoing, and other objects in view, hereinafter stated, the invention consists of the novel construction, combination and arrangement of parts hereinafter more specifically stated, and illustrated in the accompanying drawings, wherein is shown a device embodying the structure of the invention in its preferred form, but it is to be understood that changes, variations and modifications may be resorted to without departing from the scope of the invention.

In describing the invention in detail, reference is had to the accompanying drawings, which form a part of this specification, and wherein like characters of reference indicate corresponding parts throughout the several views, and wherein:

Figure 3 is a plan view of some of the parts shown in Figure 1.

Figure 4 is an end view of the machine shown in Figure 2.

Figure 5 is a transverse section taken on the line 5—5 of Figure 2.

Figure 6 is a view of the parts shown in Figure 5, with parts arranged in different operative position.

Figure 7 is a transverse section taken on the line 7—7 of Figure 2.

Figure 8 is a plan of a cam developed, and

Figure 9 is a perspective view of a container, partly broken away, used in carrying out the invention.

Figure 1:
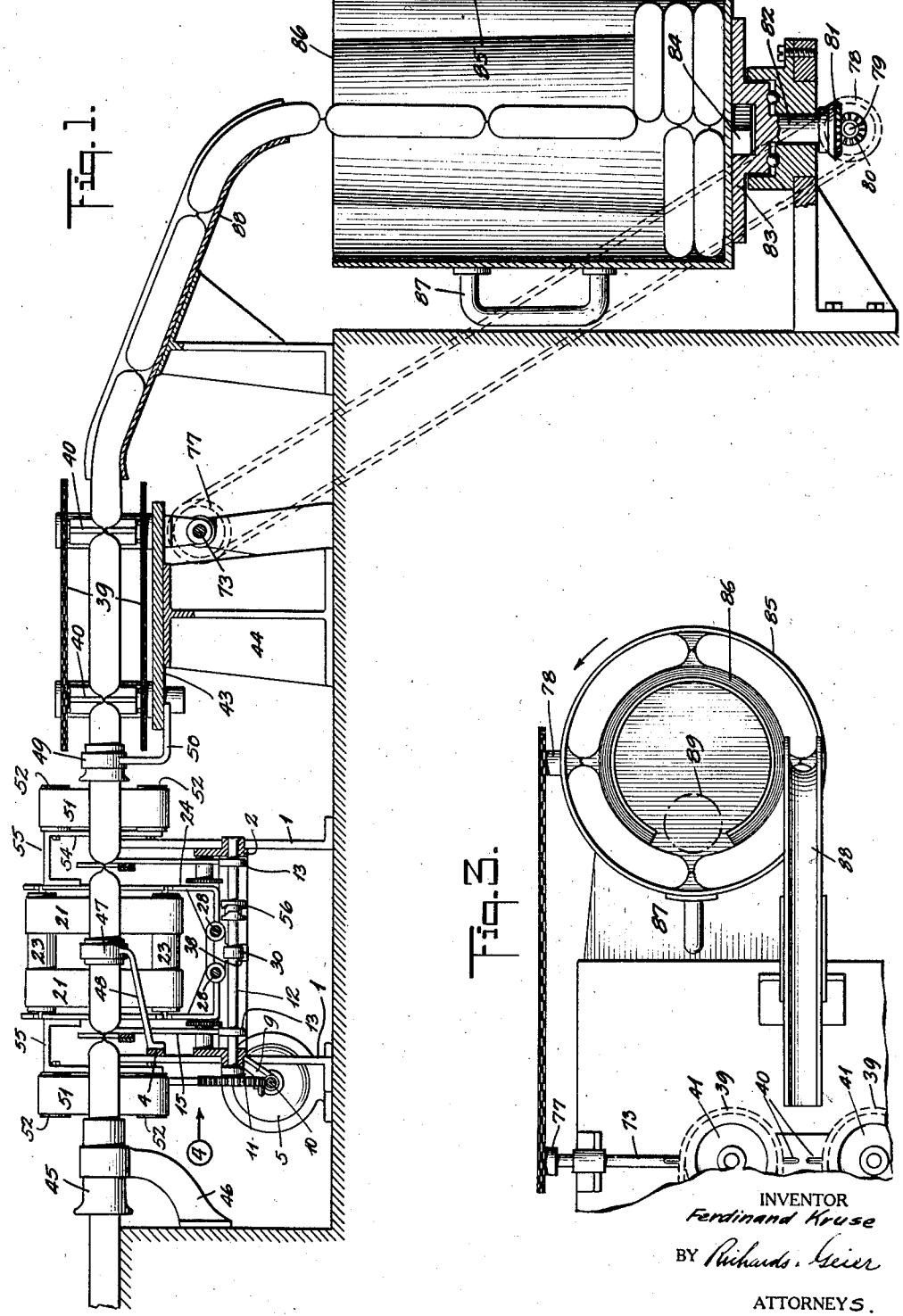
Figure 1 is a vertical longitudinal section through the machine.
Figure 2:
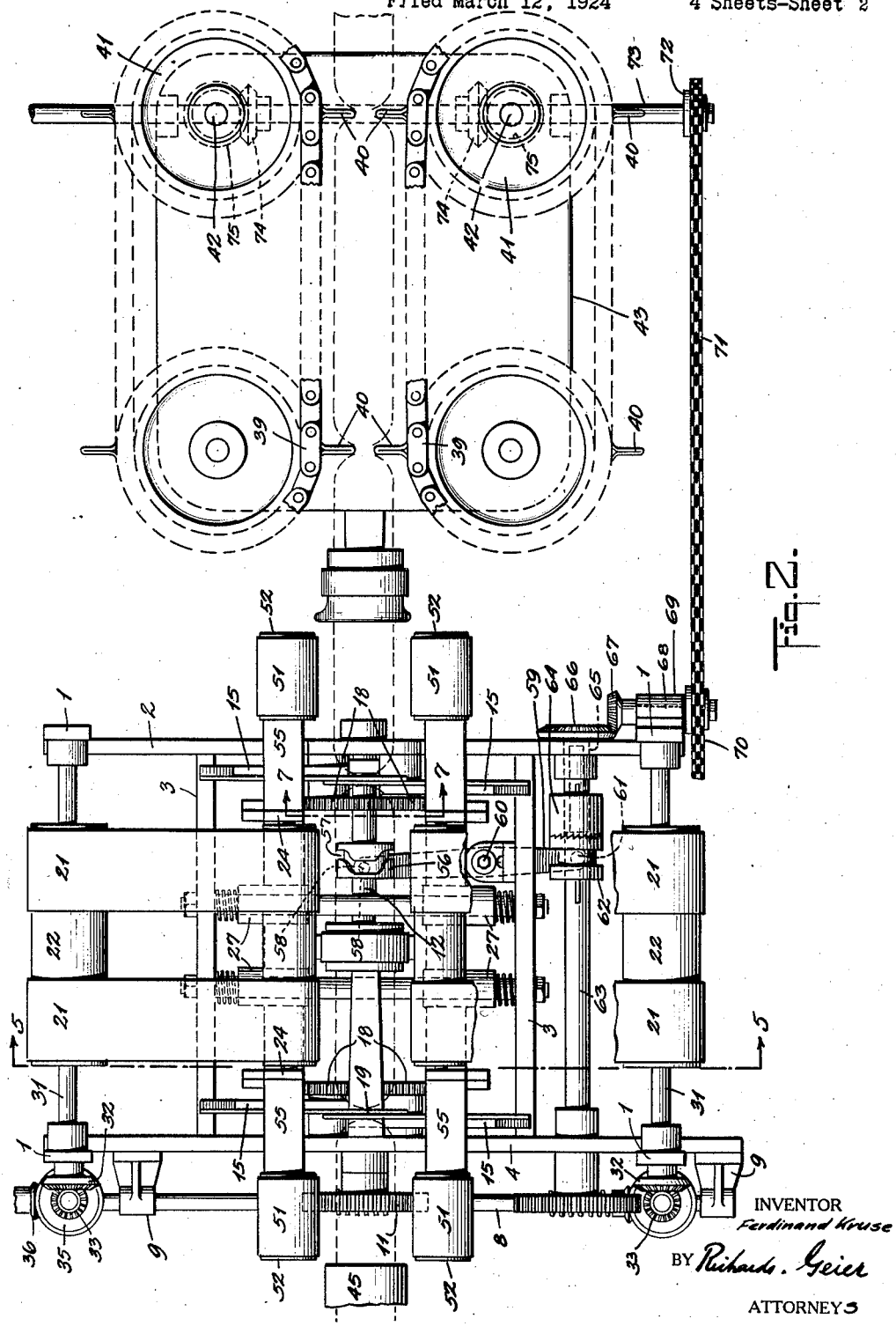
Figure 2 is a plan of a machine embodying the invention.

As illustrated in the drawings, the machine is provided with three sets of elements; gripping devices for engaging a sausage casing at predetermined points, and squeezing the sides of the casing together, means for twisting the casing at the points squeezed, and draw feeding mechanism.

Each of said three sets of elements is operated by cams secured to a shaft, which is operated by an electric motor.

In the drawings, 1 represents the vertical standards of a main frame, having cross bars 2, secured thereto on opposite sides of the frame.

Transverse bars 3 extend from, and are connected with the cross bars 2. The frame is also provided with an auxilliary cross bar 4, arranged above one of the cross bars 2, as shown in Figure 4.

Driving power for the machine may be furnished of any suitable kind, but as shown in the drawings, an electric motor 5 is used, having its armature shaft 6 connected by a coupling 7 with a shaft 8 journalled in bearings secured to the main frame.

The shaft 8 is provided with a worm 10, which engages a worm gear 11, secured to a shaft 12, journaled on the main frame.

The shaft 12 is provided with separate cams, each adapted to operate one of the sets of operative elements.

As shown in Fig. 7, the shaft 12 is provided with a cam 13, which intermittently engages an offset or lug 14, of one of a pair of levers 15, each of which are pivoted at 16 to a bracket 17, formed on one of the cross bars 2.

Each of the arms 15 is connected with a gear 18, which engage each other, so that when one of the arms is moved inwardly by the cam 13, engaging the offset, or lug 14 of one of the arms, the other arm is moved inwardly at the same time, by means of the engaging gears.

A spring connected with one of the arms 15 normally holds the arms outwardly.

The arms 15, as shown in Fig. 4, are provided on their upper end with squeezing plates 19, which may be of any suitable material, such as celluloid, adapted to compress, without injuring, a sausage casing.

The inner edges or margins of the plates 19, are cut away on inclined lines 20, so that when the sausage casing is gripped by the plates 19, they will squeeze the walls of the casing together.

When in such position the curved juncture of the inclined edges 20 do not come in contact or overlap, but leave a space between said junctures to hold the squeezed portion of the casing lightly, so that it may not be cut or injured by the twisting operation When the machine is in operation and the shaft 8 is rotated by the motor 5, and the worm gear 11 rotated by the worm 10 on the shaft 8, the shaft 12 is also rotated, and the cam 13 thereon, by bearing against the lug 14 of one of the arms 15, forces the upper ends of said arms toward each other, bringing the plates 19 into overlapping arrangement and squeezing the sausage casing at the desired parts.

After the sausage casing has been squeezed to the desired extent, or simultaneous with the squeezing operation, the sausage casing is twisted by means of oppositely disposed endless belts 21.

As shown in Figs. 4 and 5, the belts 21 are each supported upon a driving pulley 22 and on two idle pulleys 23, mounted upon brackets.

Each of the brackets is made in the form of a yoke, as shown in Fig. 1, with oppositely disposed arms 24, provided with inclined recesses 25 to receive the bearing pins 26 of the idle rollers 23.

The lower end of the yoke is provided with bosses 27, as shown in Fig. 6, which have a sliding engagement on cross rods 28 secured to the transverse bars 3 of the main frame.

The yokes having the brackets 24 are normally pressed inwardly toward each other by means of springs 29 mounted upon said transverse rods, and are forced outwardly against the tension of said springs by means of a cam 30, mounted upon the cam shaft 12.

Power is imparted to the drive pulleys 22 by means of the shafts 31 upon which said pulleys are mounted and a bevel gear 32 secured to said shaft, which engages a bevel gear 33 mounted upon a vertical shaft 34.

The vertical shaft 34 is provided on its lower end with a bevel gear 35, which engages a gear 36 secured to the shaft 8. As the shaft 8 rotates, and through its connections rotates the drive spindle 31 of the belts 21, the oppositely disposed belts move in opposite directions, thereby giving a twisting movement to the sausage casing.

The twisting movement imparted to the sausage casing, like the gripping or squeezing movement, is intermittent, and such intermittent movement is provided for by means of the cam 30 secured to the cam shaft 12.

As the shaft 12 rotates, the cam 30 thereon bears against lugs 38, formed on the lower portion of the yoke having the bracket arms 24 and press the yokes apart as shown in Fig. 5.

When the action of the cam upon the lugs 38 is released, the springs 29 press the yokes and brackets inward until the belt 21 comes in contact with the sausage casing as shown in Fig. 6.

While in such position, the belts operated by the drive shaft 31, and shaft 8, with their connecting gearing, imparts a twisting movement to the sausage casing.

The belts 21 are made of rubber or other stretchable material, permitting the belts to stretch, as shown in Fig. 6, or contract, as shown in Fig. 5.

Between the intervals when the squeezing and the twisting elements are in operation, the sausage casing is fed or drawn through the machine by means of two oppositely disposed endless link belts 39 provided with blades 40, which are positioned apart the length of one sausage.

Each movement of the belts feeds two sausage lengths of the casing to the machine.

The belts 39 are mounted upon sprocket wheels 41, and the sprocket wheels are mounted upon vertical spindles 42, mounted upon a table 43, which is supported upon a vertical pedestal, 44.

As the sausage casing is drawn through the machine it is supported by an initial guide sleeve 45 secured to a bracket 46, and by an intermediate sleeve 47, which is mounted upon a bracket 48, secured to the auxiliary cross bar 4 of the main frame.

A sleeve 49 also supports the sausage casing adjacent the endless link belts and is supported on a bracket 50, secured to the table 43.

Holding means are also preferably provided to bear against the sausage casing while the casing is being squeezed such means consisting of bands 51, mounted upon spools 52.

The spools 52 are supported upon the pendant arm 54 of a bracket having a cross arm 55, by means of which the bracket is secured to one of the arms 24 of the yokes slidingly mounted upon the cross rods 28. By means of such construction the belts 21 are moved toward and away from the sausage casing.

The feeding mechanism is operated by a cam 56 secured to the cam shaft 12, and provided with a peripheral groove 57 which engages a pin 58, secured to one end of a lever 59. The lever 59 is pivoted at 60 and is provided with a pin 61, engaging a clutch member 62, that has a sliding engagement on an auxiliary shaft 63. This latter shaft is driven by a worm carried by the shaft 8 and meshing with a gear on the shaft 63 as clearly shown in Fig. 4.

One end of the shaft 63 is reduced and engages a clutch member 64 that is mounted on a stub shaft 65 journaled in a bearing mounted on the main frame.

A bevel gear 66 is secured to one end of the stub shaft 65 and engages a bevel gear 67 secured to a stub shaft 68, journaled on a bearing 69 supported upon the main frame.

The opposite end of the stub shaft 68 is provided with a sprocket wheel 70 which engages an endless chain 71. This chain also engages a sprocket wheel 72 secured to one end of a shaft 73. The shaft 73 is provided with two bevel gears 74.

These bevel gears engage corresponding gears 75 secured to the vertical shafts 42 which operate the drive sprocket wheels 41 of the endless chains 39.

As the rotation of the shaft 12 operates the cam 56, and moves the clutch member 62 out of engagement with the clutch member 64, the feeding device is inoperative.

When, however, the action of the cam 56 brings the clutch member 62 into engagement with the clutch member 64, the bevel gears 66 and 67 are set in operation and the endless chain 71 operates the horizontal shaft 73 and the vertical shaft 42 and give a drawing operation to the endless chains 39. When so operating, the blades 40 of the endless chains draw the sausage casing outward two sausage lengths with each movement of the endless chains.

One end of the shaft 73 is provided with a sprocket wheel 77 indicated by dotted lines in Fig. 1. The wheel 77 is connected with a sprocket wheel 78 secured to a stub shaft 79, which shaft is also provided with a bevel gear 80 which engages a bevel gear 81 secured to a shaft 82 of a supporting base 83. The base 83 is provided with an angular recess engaging an angular boss 84, on the bottom of a container 85.

The container 85 is provided with an inner wall 86, as shown in Figs. 1 and 3, and with a handle 87, by means of which the container may be removed from its supporting base.

As the sausages are delivered from the machine they are passed over a guide way 88 and into the space between the inner and outer walls of the container.

As the container is revolved by means of the endless chain connected with the sprocket wheel 78 and the gears 80 and 81, the sausages are laid in circular lines as shown in Fig. 3.

By means of such an arrangement of the sausages within the container, the sausages within the container may be cut from those passing through the machine, and a carrying stick 89, indicated by dotted lines in Fig. 3 may be inserted between the free margins of the inner wall of the container, and by tilting the container, the sausages may be removed from the container on the stick, arranged in double rows straddling the stick, each row being two sausages in depth.

When so arranged the sticks and sausages may be most conveniently disposed on racks in a smoke house.

The main purpose of the bands 51 is to hold the sausage casing while being squeezed and to move away from the casing while being twisted. Where the squeezing and twisting operation is simultaneous or nearly so, the bands 51 may be secured to the arms 54 of a bracket 55 secured to one of the arms 24 of the yokes carrying the twisting belts 21.

In some cases, however, I prefer to have the squeezing operation precede the twisting operation, and in such cases the bands 51 may be secured to the arms 24, carrying the squeezing blades.

By means of such construction and arrangement, the bands 51 may be moved outwardly with the upper ends of the arms 24 away from the sausage casing, while being operated upon by the twisting belts.

It is not essential that the twisting belts continue in contact with the sausage casing during the entire time of the twisting operation.

The twisting means may be so timed as to move outwardly from the sausage casing after giving the casing one revolution. The momentum given the casing thereby is sufficient to carry the casing through three or four revolutions, while the casing is free from contact with either the twisting belts 21 or the holding belts 51.

Having thus described my invention, what I claim as new and desire to secure by Letters Patent, is:—

1. In a sausage twisting machine, the combination of a set of squeezing elements, a set of twisting elements, a set of feeding elements, a shaft, and means including cams mounted on said shaft for operating each of said sets of elements.

2. In a sausage twisting machine, the combination of a main frame, a power driven shaft journaled on said frame and provided with a worm, a shaft journaled on said frame and extending transversely of said worm shaft and provided with a gear engaging said worm, a cam mounted on said shaft, and a pair of squeezing arms mounted on said frame and provided with engaging gears, one of said arms being provided with an offset adapted to engage said cam.

3. In a sausage twisting machine, the combination of a main frame, a pair of squeezing arms pivotally mounted on said frame and provided with gears engaging each other, one of said arms being provided with an offset, a shaft journaled on said frame and provided with a cam adapted to engage said offset to move the arms in one direction and a spring connected with one of said arms and said frame adapted to move said arms in an opposite direction.

4. In a sausage twisting machine, the combination of a main frame, cross bars mounted on said frame, yokes having a sliding movement on said cross bar, a shaft journaled on said frame, provided with a cam adapted to bear against lugs projecting from said yokes to move said frame in one direction, resilient means mounted upon said cross rods adapted to move said frames in an opposite direction, drive pulleys mounted upon said frame, idle pulleys mounted upon said yokes, an endless belt engaging said drive and idle pulleys and means for rotating said drive pulley.

5. In a sausage twisting machine, the combination with a main frame, having cross bars secured thereto, of oppositely disposed yokes having sliding engagement with said cross bar, idle pulleys mounted upon the arms of said yokes means for moving said yokes in opposite direction, drive pulleys mounted upon the main frame, an elastic endless belt engaging said drive and idle pulley.

6. In a sausage twisting machine, the combination of a main frame, a power driven shaft journaled on the main frame, and provided with a bevel gear, a shaft provided with a driving belt pulley, a shaft provided with bevel gears engaging corresponding gears on said power driven shaft and said belt driving shaft, cross bars mounted on the main frame, yokes having a sliding engagement on said cross bar and provided with idle pulleys and elastic belts engaging said driving pulleys and idle pulleys.

7. In a sausage twisting machine, the combination of a main frame, a shaft journaled on the main frame and provided with a cam, a lever pivoted upon said frame, and provided at one end with a pin engaging said cam, an auxiliary shaft journaled on the main frame and provided with a sliding clutch member engaging the other end of said lever, a stub shaft connected with said auxiliary shaft and provided with a bevel gear, a stub shaft journaled on the main frame and provided with a bevel gear engaging a bevel gear of the first named stub shaft, and with a sprocket wheel, a set of feeding elements comprising two oppositely disposed endless belts, each mounted upon a driven pulley, and an idle pulley, and means connected with said sprocket wheel adapted to operate said driving pulley.

8. In a sausage twisting machine, the combination of a main frame having a shaft journaled thereon, a cam mounted on said shaft, an auxiliary shaft mounted on the main frame and provided with a sliding clutch member and having a stub shaft connected therewith, a lever mounted on said frame engaging said cam and sliding clutch member, an auxiliary frame, feeding mechanism comprising a pair of endless belts provided with blades, a driving pulley and a driven pulley supporting each of said belts, and mounted upon vertical spindles journaled in said auxiliary frame, and means connecting said driving pulleys with said auxiliary shaft and said cam shaft to operate said belts in a step by step movement.

9. In a sausage twisting machine, the combination of a main frame, cross rods mounted on the main frame, oppositely disposed yokes having sliding movement on said main frame, a pair of elastic belts mounted upon rollers secured to said yokes, squeezing mechanism mounted upon the main frame and provided with pivoted arms reciprocating at their free ends, and a pair of guide belts mounted upon the arms of said yoke and movable bodily therewith.

10. In a sausage twisting machine, the combination of a main frame, squeezing elements mounted upon said frame, twisting elements mounted upon said frame, between said squeezing elements, guide belts mounted upon a frame supporting said twisting elements and arranged outside of the squeezing elements, and a guide sleeve supported on said frame and arranged between the sausage gripping parts of said squeezing elements.

11. In a sausage twisting machine, having a main frame, squeezing elements and twisting elements mounted on said frame, said squeezing elements including endless guide belts and guide sleeves arranged outside of said guide belts for the passage of a sausage casing therethrough.

12. In a sausage twisting machine, a set of feeding elements comprising oppositely disposed endless belts provided with blades, a driving pulley and a driven pulley supporting each of said belts, the driving pulley being mounted upon vertical spindles, a shaft adapted to operate said vertical spindles and provided with a sprocket wheel, a supporting base journaled upon an auxiliary frame and provided with a bevel gear engaging the bevel gear of a stub shaft connected therewith, and an endless chain connecting said sprocket wheel and stub shaft to give rotary motion to said supporting base.

13. In a sausage twisting machine, squeezing elements and twisting elements, a rotatable shaft, means controlled by the rotation of said shaft for operating said squeezing and twisting elements, a set of feeding elements including oppositely disposed endless belts, and means also controlled by the rotation of said shaft for operating said belts.

14. In a sausage twisting machine, squeezing elements and twisting elements, a rotatable shaft, means controlled by the rotation of said shaft for operating said squeezing and twisting elements, a set of feeding elements including oppositely disposed endless belts, and means also controlled by the rotation of said shaft and alternately operated with respect to the operation of the first-named means for operating said belts.

15. In a sausage twisting machine, squeezing elements and twisting elements, a rotatable shaft, means controlled by the rotation of said shaft for operating said squeezing and twisting elements a set of feeding elements including oppositely disposed endless belts, an auxiliary shaft, a clutch thereon, and means controlled by the rotation of said shaft for operating said clutch to cause the operation of said belts alternately with respect to the operation of the first-named means.

16. In a sausage twisting machine, squeezing elements and twisting elements, a rotatable shaft, means controlled by the rotation of said shaft for operating said squeezing and twisting elements, a set of feeding elements including oppositely disposed endless belts, an auxiliary shaft, a clutch thereon, and means including a cam on the first-named shaft and a rocking member pivotally mounted between said first-named and auxiliary shafts for operating said clutch to control the operation of said belts.

17. In a sausage twisting machine, a rotatable support, a delivery container mounted upon said support and having an outer wall and an inner wall spaced from the outer wall, said inner wall having a portion thereof cut away vertically throughout its length.

In testimony whereof I have affixed my signature.

FERDINAND KRUSE.